R. T. POLK.
VENDING MACHINE.
APPLICATION FILED MAY 20, 1913.

1,104,271.

Patented July 21, 1914.
3 SHEETS—SHEET 1.

Witnesses

R. T. Polk, Inventor,
by C. A. Snow & Co.
Attorneys.

R. T. POLK.
VENDING MACHINE.
APPLICATION FILED MAY 20, 1913.

1,104,271.

Patented July 21, 1914.
3 SHEETS—SHEET 2.

Witnesses

R. T. Polk, Inventor,
by C. A. Snow & Co.
Attorneys.

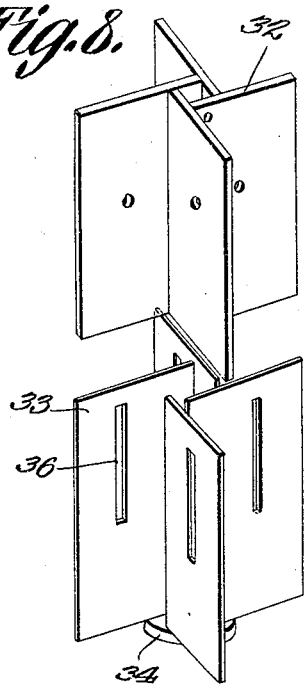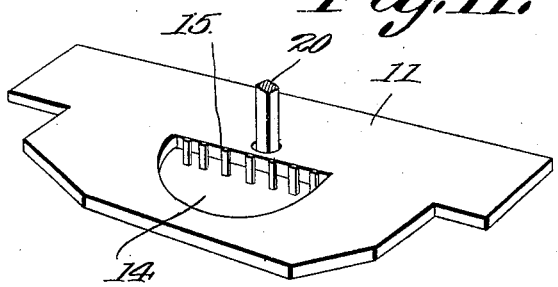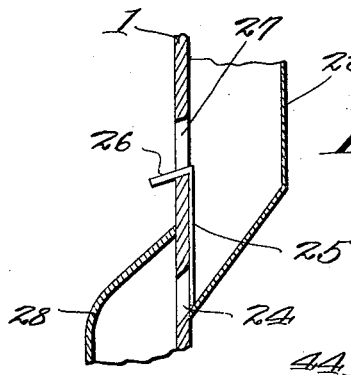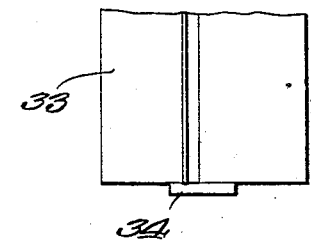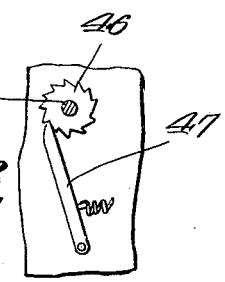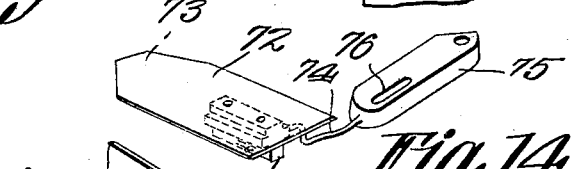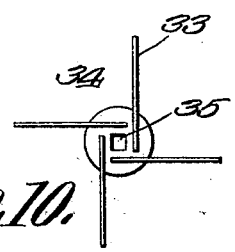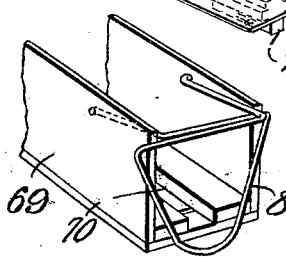

UNITED STATES PATENT OFFICE.

ROBERT T. POLK, OF SMITHS TURN OUT, SOUTH CAROLINA.

VENDING-MACHINE.

1,104,271.   Specification of Letters Patent.   Patented July 21, 1914.

Application filed May 20, 1913. Serial No. 768,892.

*To all whom it may concern:*

Be it known that I, ROBERT T. POLK, a citizen of the United States, residing at Smiths Turn Out, in the county of York and State of South Carolina, have invented a new and useful Vending-Machine, of which the following is a specification.

This invention relates to vending machines of that type known as check controlled, the principal object of the invention being to provide a machine of this character designed, when actuated, to dispense a measured quantity of material, such as peanuts, chestnuts, candies and like small articles and to also deliver a bag in which the purchaser may place the purchased material.

A further object is to provide improved means whereby the material to be dispensed will be thoroughly agitated and whereby means for measuring and feeding the material can be adjusted so as to cause any predetermined quantity to be dispensed upon the actuation of the mechanism.

Another object is to provide motor operated means for actuating the measuring and dispensing devices, there being a locking structure for holding the motor driven mechanism against movement, said structure being adapted to release the mechanism solely upon the insertion of a check of a predetermined kind.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
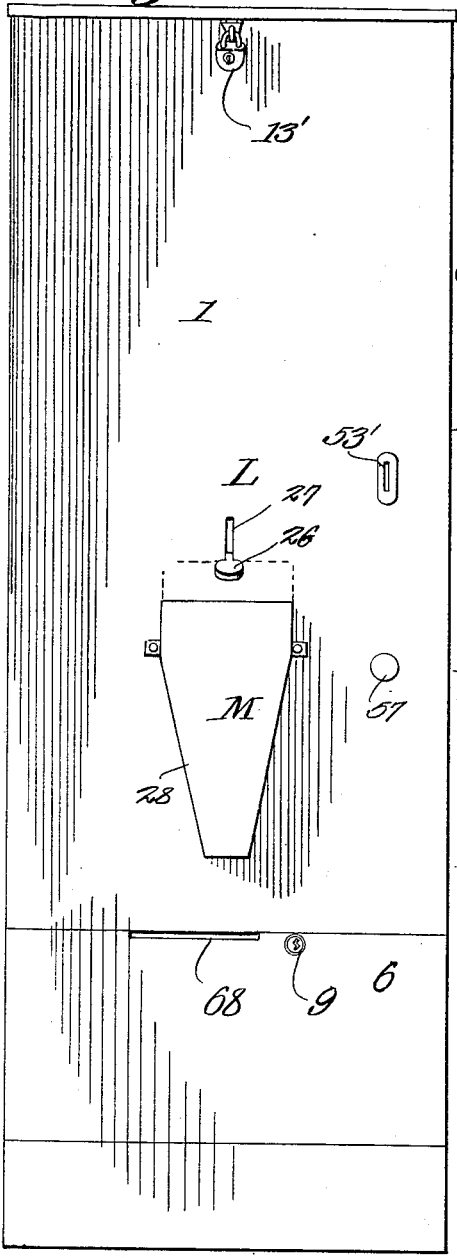
Figure 2:
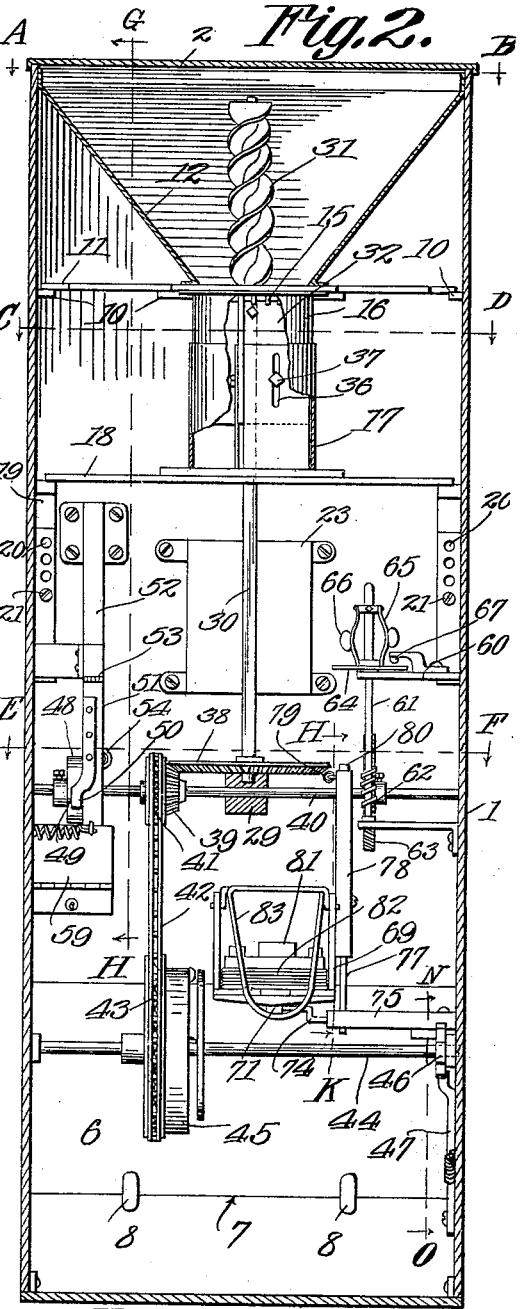
Figure 3:
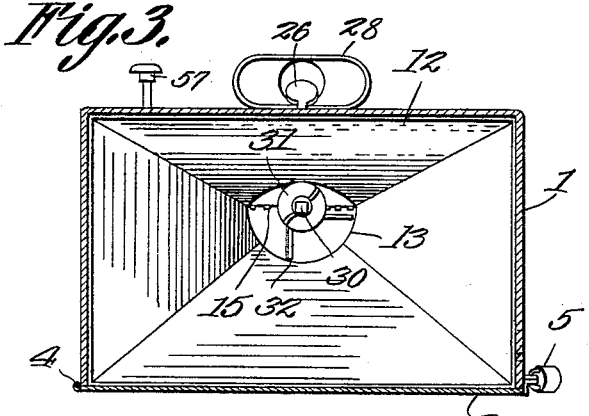
Figure 4:
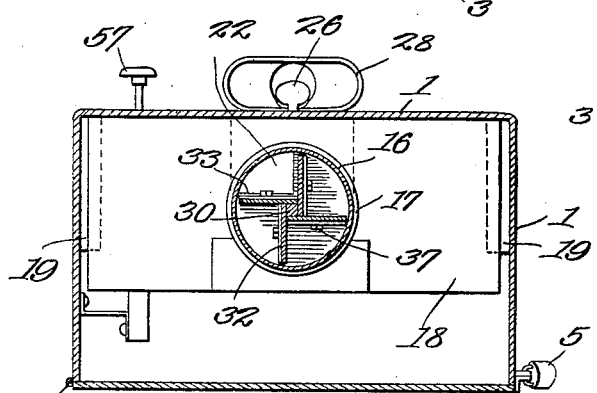
Figure 6:
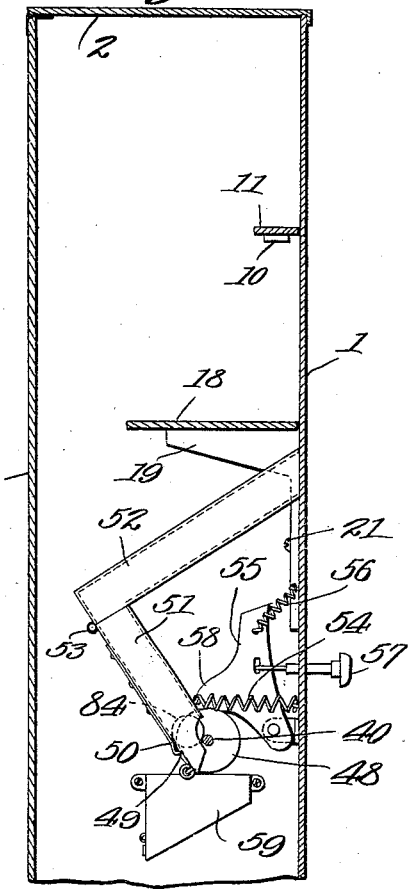
Figure 5:
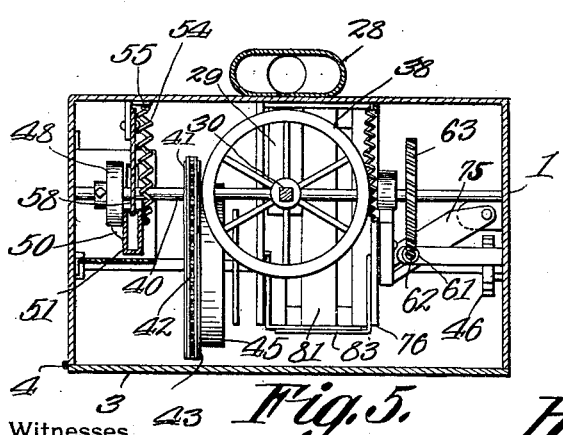
Figure 7:
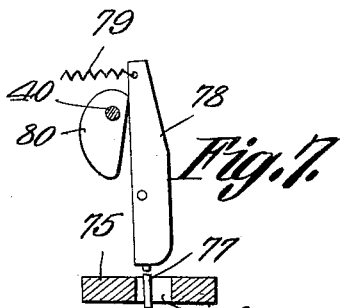

In said drawings:—Figure 1 is a front elevation of the machine. Fig. 2 is a vertical transverse section through the casing of the machine, the mechanism therein being viewed in rear elevation and certain of the parts being broken away. Fig. 3 is a section on line A—B Fig. 2. Fig. 4 is a section on line C—D Fig. 2. Fig. 5 is a section on line E—F Fig. 2. Fig. 6 is a section on line G—H Fig. 2. Fig. 7 is a section on line I—K, Fig. 2. Fig. 8 is a detail view of the revoluble feed device, the parts thereof being shown separated. Fig. 9 is a side elevation of the lower portion of said feed device. Fig. 10 is a plan view of the lower section of said device. Fig. 11 is a perspective view of the hopper supporting shelf. Fig. 12 is a section through the discharge end of the delivery chute and its cut-off, said section being taken on the line L—M Fig. 1. Fig. 13 is a side elevation of the pawl and ratchet mechanism used for holding the motor against rotation in a backward direction, said section being taken on the line N—O Fig. 2. Fig. 14 is a perspective view of the bag ejecting slide and its operating lever. Fig. 15 is a perspective view of one end portion of the bag holding box.

Referring to the figures by characters of reference 1 designates a casing of any desired proportions the same being closed at the top by a hinged cover 2 provided with a suitable lock 13'. The body portion of the casing, including the cover 2, is preferably formed separately from the back plate 3 which plate is designed to be secured to a wall or other supporting structure and is attached to one side of the casing 1 by means of hinges 4. A suitable lock 5 may be employed for securing the other side of the plate 3 to the casing so that it is thus impossible to obtain access to the interior of the casing unless the lock 5 is unfastened and the casing 1 swung forwardly and laterally away from the plate 3. A panel 6 constitutes a portion of the front of the casing 1 and is disposed adjacent the bottom of the casing, this panel being arranged across an opening 7 extending throughout the width of the casing and being held in place by means of lugs 8 which are formed integral with the panel and extend downwardly into the casing back of the lower wall of the opening 7. A suitable lock, indicated generally at 9, may be employed for securing the upper edge of the panel 6 to the casing 1. By removing this panel 6 access may be had to the interior of the lower portion of the casing.

Cleats 10 are arranged upon the inner faces of the sides and front of casing 1 and support a removable shelf 11 on which rests a hopper 12 constituting a bulk holder, this hopper being provided at its bottom with an outlet opening 13. The hopper preferably rests loosely in the casing and upon the shelf so that it can be removed readily.

Shelf 11 has a substantially semi-circular opening 14 into which the contents of the hopper 12 are adapted to discharge. Extending downwardly from the straight side of this opening are spring fingers 15.

The upper cylindrical section 16 of a measuring receptacle is secured to the bottom of the shelf 11 and extends around the opening 14 in the shelf, said opening being adapted to discharge material into the back portion of the section 16 or, in other words, into that portion of the section remote from the front of casing 1. Section 16 extends into the lower cylindrical section 17 of the measuring receptacle, this lower section being mounted on a shelf 18 supported by brackets 19 which are adjustably connected, in any suitable manner, to the casing 1. In the structure shown, each bracket has a vertical series of apertures 20 any one of which is adapted to receive a holding screw or stud 21 extending from the wall of the casing. Thus it will be seen that the brackets can be adjusted vertically so as to support the shelf 18 at any desired elevation and, when the shelf 18 is lowered, the lower section 17 of the measuring receptacle will of course move downwardly relative to the upper section 16, thus elongating the measuring receptacle and, therefore, increasing its capacity.

Shelf 18 has a segmental opening 22 surrounded by the section 17 and adapted to receive material from the front portion of said section or, in other words, from that portion of the section nearest the front of the casing 1, as shown in Fig. 4. This outlet opening 22 is disposed directly above a chute 23 secured to the inner surface of the front of the casing and leading to an outlet opening 24 in the front of the casing. A cut-off slide 25 serves normally to close the opening 24 and can be raised thus to allow material to discharge through the opening 24. The slide 25 is preferably provided with a finger piece 26 extending forwardly through a slot 27 in the front of the casing. Opening 24 discharges into a spout 28 so shaped as to direct material from the opening 24 into a bag or other receptacle placed around the lower end of the spout.

A bracket 29 extends backwardly from the front of casing 1 and constitutes a support and bearing for a vertical shaft 30 which is journaled in the shelf 11 back of the center of the opening 14. The upper portion of this shaft projects into the hopper 12 and carries an agitating worm 31 so pitched as to direct downwardly toward the opening 14, the contents of the hopper 12 when the shaft 30 is rotating in the proper direction. This shaft 30 also extends longitudinally through the center of the measuring receptacle 16—17 and extending from that portion of the shaft within the measuring receptacle are blades 32 disposed at right angles to each other. Shaft 30 is preferably square and the blades 32 bear against the respective faces of the shaft so as thus to fit snugly around the shaft and rotate therewith. Blades 32 are approximately of the same length as the section 16 and slidably mounted on each blade 32 is an extension blade 33, these extension blades being connected at their lower ends by a disk 34 having a square opening therein, as shown at 35, so as to receive and slide upon the shaft 30. Slots 36 are formed longitudinally in the extension blades and are adapted to receive guide screws or the like extending from the blades 32, as shown at 37 in Figs. 2 and 4. Blades 33 are loosely mounted upon the blades 32 and the disk 34 constantly bears upon the shelf 18. Thus it will be seen that when shelf 18 is lowered and section 17 moves downwardly relative to section 16, the extension blades 33 will also move downwardly relative to blades 32. Therefore under all conditions the shaft 30 has blades extending therefrom throughout the length of the measuring receptacle 16—17. The upper edges of the blades 32 are adapted to move close to the lower ends of the spring fingers 15.

Secured to the lower end of the shaft 30 is a gear 38 constantly meshing with a smaller gear 39 secured to a transverse shaft 40, this shaft being journaled in the sides of casing 1 and also in the bracket 29. This shaft has a sprocket 41 receiving motion, through a chain 42, from a larger sprocket 43 loosely mounted on a winding shaft 44 which is journaled in the sides of casing 1. A spring 45 is secured at one end to the sprocket 43 and at its other end to the shaft 44 and it will be apparent that by rotating shaft 44 in one direction this spring 45 will be wound provided sprocket 43 is held against rotation. A ratchet wheel 46 is secured to shaft 44 and is normally engaged by a spring controlled pawl 47. Thus the shaft 44 is prevented from rotating backwardly after the spring 45 has been wound. It is to be understood that instead of utilizing a spring for the purpose of driving the sprocket 43, any other form of motor may be used.

Gear 39 is preferably so proportioned relative to gear 38 as to cause a one-quarter turn of gear 38 during each revolution of gear 39. In other words, four complete revolutions of the gear 39 are necessary in order to bring all of the blades 33 successively into position at one side of the discharge opening 22.

For preventing the shaft 40 from rotating under the action of the motor 45, a disk 48 is secured to said shaft 40 and has a notch 49 in its periphery. This notch normally receives a locking ear 50 extending laterally and forwardly from the lower movable member 51 of the coin chute 52. This coin chute is inclined downwardly and rearwardly from a coin slot 53' and the lower member 51 of the coin chute is hingedly connected to the rear portion of the upper member of the chute, as shown at 53 and is adapted to receive the coin therefrom, this lower member 51 extending close to and back of the shaft 40. Thus it will be seen that when a coin is deposited in the opening or slot 53', it will gravitate within the chute 52 and its extension 51 until it is brought to a stop between shaft 40 and the back of the chute extension 51, as shown in Fig 6. A spring 54 is connected to the lower portion of the chute extension 51 and serves to hold said extension normally in a predetermined position relative to the upper portion of the chute. A coin depressing lever 55 is fulcrumed upon the front portion of the casing 1 and is held normally drawn toward the front of the casing by a spring 56. A plunger 57 is connected to this lever and by pressing the plunger inwardly, the rear arm 58 of the lever will bear downwardly on the coin supported in the lower portion of the chute extension 51 so as thus to press the coin between shaft 40 and the back of the chute extension 51, thus moving the extension 51 to thereby withdraw ear 50 from out of the notch 49 and release disk 48 and shaft 40. As soon as the coin passes the shaft 40 the spring 54 will bring the section 51 back to its normal position so that, upon the completion of one revolution of disk 48, ear 50 will drop back into notch 49 and thus hold shaft 40 against further rotation. The coin, when discharged past shaft 40, will drop into a coin box 59 supported under the chute extension 51.

For the purpose of regulating the speed of rotation of shaft 40 and the parts driven thereby, a governor is provided. This governor is mounted on a shelf 60 and a shaft 61 is journaled in the shelf and has a worm 62 which receives motion from a worm wheel 63 rotating with shaft 40. A disk 64 is slidably mounted on shaft 61 and is connected to spring arms 65 carrying the balls 66 of the governor. A shoe 67 is fixedly supported in the path of disk 64 so that, when the shaft rotates at a predetermined speed, the balls 66 will bow the springs 65 and cause disk 64 to bear upwardly against shoe 67.

In order that the customer may be supplied with a bag in which to place the nuts or other articles dispensed, a slot 68 is formed in the front of the casing 1 and flush with the bottom of a box 69 supported in any suitable manner within the casing, the said slot extending throughout the width of the bottom of the box. A longitudinal slot 70 is formed in the bottom of the box and is adapted to receive a block 71 formed upon the bottom of a slide 72, this slide being provided at its front end, with a broad tongue 73. Block 71 is loosely engaged by a finger 74 extending from one end of a lever 75 which is fulcrumed in the casing and has a longitudinal slot 76. Said slot receives a finger 77 extending downwardly from a lever 78, the upper end of this lever being engaged by a spring 79 which serves to hold the lever normally pressed against a cam 80 which is secured to and rotates with shaft 40. Thus it will be seen that once during each rotation of shaft 40, lever 78 will be actuated so as to swing lever 75 which, in turn, will push block 71 and slide 72 forwardly toward the delivery slot 68 after which spring 79 will return the parts to their initial positions. The bags to be dispensed are adapted to be placed in a pile within the box 69 with the folds of the collapsed bottoms thereof lowermost. Thus it will be seen that when slide 72 is pushed forwardly, the tongue 73 will enter the fold of the collapsed bottom of the lowermost bag and cause the bag to be pushed outwardly through the slot 68 where it can be easily grasped and withdrawn by the customer. A weight 81 of any desired form can be mounted on the pile of bags, said pile of bags being indicated at 82 in Fig. 2 and in order that the weight and the bags may be prevented from shifting rearwardly during the return movement of the slide 72, a holding bail 83 is pivotally connected to the sides of the box 69 and extends downwardly back of the weight and the pile 82, as shown in Fig. 2. This bail, however, can be easily swung upwardly out of position whenever it is desired to place a new pile of bags in position.

As hereinbefore stated, the hopper 12 is to be partly or entirely filled with the nuts or other material to be dispensed and a pile of bags 82 is to be placed in the box 69. If a spring motor is used, the same is wound in any suitable manner after which the machine is ready for use. When a coin of the proper denomination is inserted in slot 53 it will, as hereinbefore described, gravitate to a position between the back of the chute extension 51 and the shaft 40. This coin has been indicated at 84 in Fig. 6. The customer then presses inwardly on the plunger 57 and causes the rearwardly extending arm 58 of lever 55 to push downwardly on the coin thus wedging the coil between the extension 51 and shaft 40 and causing ear 50 to withdraw from notch 49. Coin 84 promptly falls into the box 59. As soon as the ear 50 has withdrawn from notch 49, the motor actuated mechanism becomes unlocked and motion is therefore transmitted to shaft 40 from spring 45 through the sprocket 43, chain 40 and sprocket 41. One complete rotation of shaft 40 takes place before the ear 50 again becomes seated within notch 49. During this rotation of shaft 40 the gear 38 is given a one quarter rotation. The speed of rotation is controlled by the governor. During the quarter rotation of gear 38 and shaft 40, the blades 32 and 33 within the measuring receptacle 16—17 will be given a one quarter turn thus bringing to position above the opening 22, the material contained between two adjoining blades 32. Obviously the material thus brought to position above the opening 22 will be discharged into the chute 23 and against the closure 25. During this operation cam 80 is revolved so as to actuate the bag ejecting means in the manner described, thus bringing a bag to position within the slot 68 where it can be easily reached and pulled outwardly and then placed around the discharge end of the spout 28. By then lifting the slide 25, the material contained within chute 23 will be caused to gravitate into the bag. Obviously by elongating or shortening the receptacle 16—17, the amount of material to be discharged at each operation can be regulated.

By providing the fingers 15, should any nuts or the like fall upon the upper edges of the blades 32, they will be thrown therefrom so as not to choke the apparatus.

What is claimed is:—

1. The combination with a bulk holder, of a measuring receptacle consisting of telescopically connected upper and lower sections, said receptacle having an outlet, and a series of revoluble blades within the receptacle for directing material from the inlet to the outlet, said blades being extensible with the receptacle.

2. The combination with a bulk holder, of a measuring receptacle consisting of telescopically connected sections, said receptacle having an outlet, and a revoluble series of extensible blades within the receptacle for directing material from points below the inlet to points above the outlet.

3. The combination with a bulk holder, of a measuring receptacle consisting of telescopically connected sections, said receptacles having an outlet, a revoluble series of extensible blades within the receptacle for directing material from points below the inlet to points above the outlet, and means extending from the inlet of the receptacle for preventing lodgment of material upon the upper ends of the blades.

4. The combination with a bulk holder and a receptacle section depending therefrom, there being an opening between the bulk holder and said section and constituting an inlet to the said section, of a vertically adjustable shelf, a lower receptacle section movable with the shelf and having an outlet out of vertical alinement with the inlet, the two sections being telescopically connected, and means revoluble within the sections and adjustable longitudinally to a length equal to the length of the measuring receptacle, for directing material in the receptacle from points below the inlet to points above the outlet.

5. The combination with a bulk holder, of a measuring receptacle consisting of telescopically connected sections, said receptacle having an outlet, a revoluble series of extensible blades within the receptacle for directing material from points below the inlet to points above the outlet, means extending from the inlet of the receptacle for preventing lodgment of material upon the upper ends of the blades, a stationary chute for receiving material from the outlet, and a cut-off for the chute.

6. The combination with a bulk holder, of a measuring receptacle consisting of telescopically connected sections, said receptacle having an outlet, a revoluble series of extensible blades within the receptacle for directing material from points below the inlet to points above the outlet, means extending from the inlet of the receptacle for preventing lodgment of material upon the upper ends of the blades, a stationary chute for receiving material from the outlet, a cut-off for the chute, and a spout extending from the chute for projecting into a receptacle.

7. The combination with a receptacle of variable capacity, of a shaft, means upon the shaft for rotation within the receptacle and dividing the contents thereof into separate bodies, said receptacle having an inlet and an outlet out of vertical alinement, a motor, and means operated by the motor for imparting a partial rotation to the shaft to bring one of the bodies of material from below the inlet to a point above the outlet.

8. The combination with a receptacle of variable capacity, of a shaft, means upon the shaft for rotation within the receptacle and dividing the contents thereof into separate bodies, said receptacle having an inlet and an outlet out of vertical alinement, a motor, means operated by the motor for imparting a partial rotation to the shaft to bring one of the bodies of material from below the inlet to a point above the outlet, a bulk holder for directing material toward the inlet, and means revoluble with the shaft and within the bulk holder for feeding such material to the inlet.

In testimony that I claim the foregoing as my own, I have hereto affixed my signature in the presence of two witnesses.

ROBERT T. POLK.

Witnesses:
SELINA WILLSON,
HERBERT D. LAWSON.

Copies of this patent may be obtained for five cents each, by addressing the "Commissioner of Patents, Washington, D. C."